Feb. 5, 1929.                                                1,701,414
R. MARTI
ATTACHMENT FOR CULTIVATORS
Filed Jan. 23, 1928
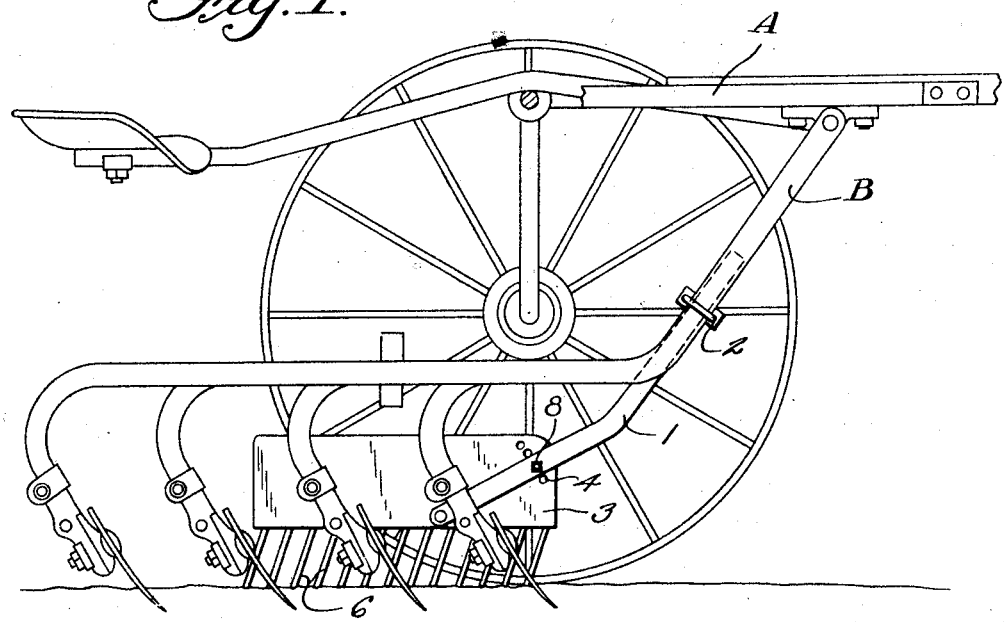
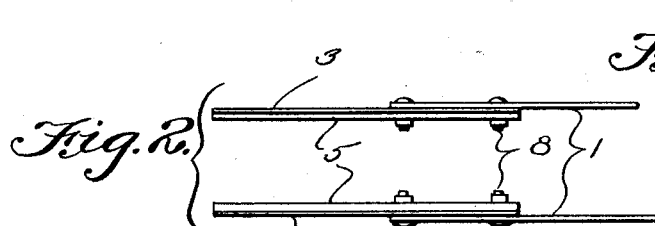
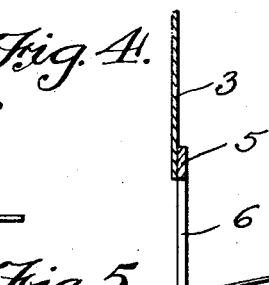
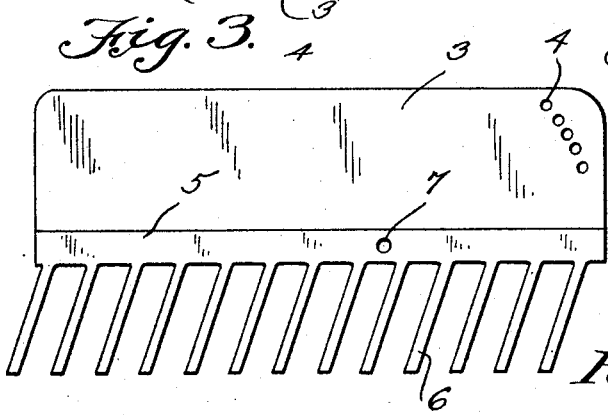
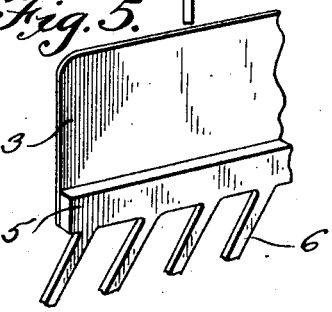
Roy Marti
INVENTOR Patented Feb. 5, 1929.

1,701,414

UNITED STATES PATENT OFFICE.

ROY MARTI, OF CHURCH, IOWA.

ATTACHMENT FOR CULTIVATORS.

Application filed January 23, 1928. Serial No. 248,828.

This invention relates to cultivators, and its general object is to provide a cultivator attachment that will protect plants during the cultivation thereof, and at the same time will break up the soil adjacent the plant and cause pulverized soil to be thrown about the plants, with the result quick and proper growth will be assured.

A further object of the invention is to provide a cultivator attachment in the nature of a fender, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of a cultivator showing the application of the attachment forming the subject matter of the present invention.

Figure 2 is a top plan view of the attachment per se.

Figure 3 is a side elevation of one of said attachments.

Figure 4 is a vertical sectional view of the fender.

Figure 5 is a fragmentary perspective view of one of the attachments.

Referring to the drawings in detail, the letter A indicates a cultivator of the usual construction and which includes the usual plow beams B. The device which forms the subject matter of the present invention is arranged whereby two of such devices cooperate to perform their intended function on a cultivator of the double beam type, and as suggested in Figure 2 of the drawings. Each of the devices includes an attaching arm 1 which is bent intermediate its ends and has one end portion secured to a beam through the medium of a shackle bolt connection 2. The opposite end portions of the respective arms have secured thereto the body 3 of the devices, and it will be noted that the bodies of the devices are elongated in formation and are relatively thin with a plurality of openings 4 arranged in row formation adjacent the forward corners thereof as best shown in Figure 3 of the drawings.

Formed with or secured in any well known manner to the lower longitudinal edge of the bodies is a relatively thick strip 5 which has depending therefrom in spaced parallelism with respect to each other a plurality of rearwardly inclined teeth 6.

The strips 5 are each provided with an opening 7 for receiving a pivot pin for pivotally securing the devices to the lower end of the arms 1, and the lower portions of the arms are secured in one of the openings 4 through the medium of a bolt and nut connection 8. By this construction it will be apparent that the device may be adjusted with respect to the arms.

From the above description and disclosure of the drawings, it will be obvious that the devices are to be secured to a cultivator and adapted for the purpose of not only protecting plants, but will break up the soil and cause pulverized soil to be thrown about the plants.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A cultivator attachment of the character described comprising an arm, means for securing one end of said arm to the beam of a cultivator, a body adjustably secured to the opposite end portion of said arm, a strip secured to the lower longitudinal edge of said body and being provided with an opening which extends through said body for pivotally securing the attachment to the lower end of said arm, and a plurality of rearwardly inclined teeth formed with said strip and depending therefrom.

2. A cultivator attachment of the character described comprising a flat elongated body provided with openings adjacent one corner thereof, means for adjustably securing the body to the beam of a cultivator, means included in the first mentioned means and arranged through one of said openings, a strip secured to the lower longitudinal edge of said body and being provided with an opening passing through the body for pivotally receiving the lower end of the first mentioned means, a plurality of teeth formed with said strip and disposed at a rearward inclination, and the attachments adapted to be arranged in cooperating pairs.

In testimony whereof I affix my signature.

ROY MARTI.